(12) United States Patent
Chan et al.

(10) Patent No.: US 8,484,467 B2
(45) Date of Patent: Jul. 9, 2013

(54) AUTHENTICATION IN COMMUNICATIONS NETWORKS

(75) Inventors: Tat Keung Chan, San Diego, CA (US); Gabor Bajko, Budapest (HU)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1453 days.

(21) Appl. No.: 11/606,910

(22) Filed: Dec. 1, 2006

(65) Prior Publication Data

US 2007/0204160 A1     Aug. 30, 2007

Related U.S. Application Data

(60) Provisional application No. 60/741,055, filed on Dec. 1, 2005, provisional application No. 60/757,872, filed on Jan. 11, 2006.

(51) Int. Cl.
*H04L 9/32* (2006.01)
*G06F 21/00* (2006.01)
*G06F 7/04* (2006.01)

(52) U.S. Cl.
USPC ........... 713/168; 713/156; 713/170; 713/182; 726/4; 726/5

(58) Field of Classification Search
USPC ................. 713/168, 156, 170, 182; 726/4, 5
See application file for complete search history.

(56) References Cited

U.S. PATENT DOCUMENTS

| | | | |
|---|---|---|---|
| 7,895,648 B1 * | 2/2011 | Nandy et al. | 726/14 |
| 2003/0172307 A1 * | 9/2003 | Henry et al. | 713/201 |
| 2005/0163078 A1 * | 7/2005 | Oba et al. | 370/331 |
| 2006/0129815 A1 * | 6/2006 | Baldwin | 713/168 |
| 2006/0265739 A1 * | 11/2006 | Bhaskaran et al. | 726/4 |
| 2008/0228651 A1 * | 9/2008 | Tapsell | 705/65 |

FOREIGN PATENT DOCUMENTS

EP     1 343 342 A1     9/2007

OTHER PUBLICATIONS

ETSI TS 133 220 v6.6.0, "*Universal Mobile Telecommunications System (UMTS); Generic Authentication Architecture (GAA); Generic Bootstrapping Architecture* (3GPP TS 33.220 version 6.6.0 Release 6)" Sep. 2005, pp. 1-42.
ETSI TS 133 222 v7.0.0, "*Universal Mobile Telecommunications Systems (UMTS); Generic Authentication Architecture (GAA); Access to Network Application Functions using Hypertext Transfer Protocol over Transport Layer Security (HTTPS)* (3GPP TS version 7.0.0 Release 7)" Sep. 2005, pp. 1-22.
International Search Report PCT/IB2006/003904 filed Nov. 30, 2006.

* cited by examiner

*Primary Examiner* — Aravind Moorthy

(57) ABSTRACT

The invention relates to a method of authenticating a user equipment in a communications network. The method involves sending a message from a network entity to the user equipment. This message includes a set of options for an authentication procedure for authenticating an internet protocol communication over a first interface between the user equipment and the network entity; said options including a "shared key"-based authentication procedure. The method also involves selecting an option from the set. In the event that the "shared-key"-based authentication procedure is selected, a shared secret from a security key established in a generic bootstrapping architecture (GBA) is generated over a second interface between the user equipment and a bootstrapping service function. The shared secret is then used to compute and verify authentication payloads in the key-based authentication procedure for the communication over the first interface.

24 Claims, 6 Drawing Sheets

FIG. 2a

ND: N(GBA) | Ni | KEi | SAi1 | HDR

FIG. 2b

ND: [N(GBA)] options list | Nr | KEr | SAr1 | HDR

FIG. 2c

TSr | TSi | SAi2 | AUTH | NAF-ID | IDr | B-TID | IDi | HDR

SK = {NAF-ID, IDr, B-TID, IDi}

FIG. 2d

TSr | TSi | SAr2 | AUTH | NAF-ID | IDr | HDR

SK = {NAF-ID, IDr}

FIG. 3a TSr | TSi | SAr2 | AUTH | CERT | IDr | HDR

FIG. 4a list | N(GBA) options | Ni | KEi | SAi1 | HDR

FIG. 4b N(GBA) | Nr | KEr | SAr1 | HDR

FIG. 4c TSr | TSi | SAi2 | AUTH | CERT | NAF-ID | IDi | HDR

FIG. 4d TSr | TSi | SAr2 | AUTH | B-TID | IDr | HDR

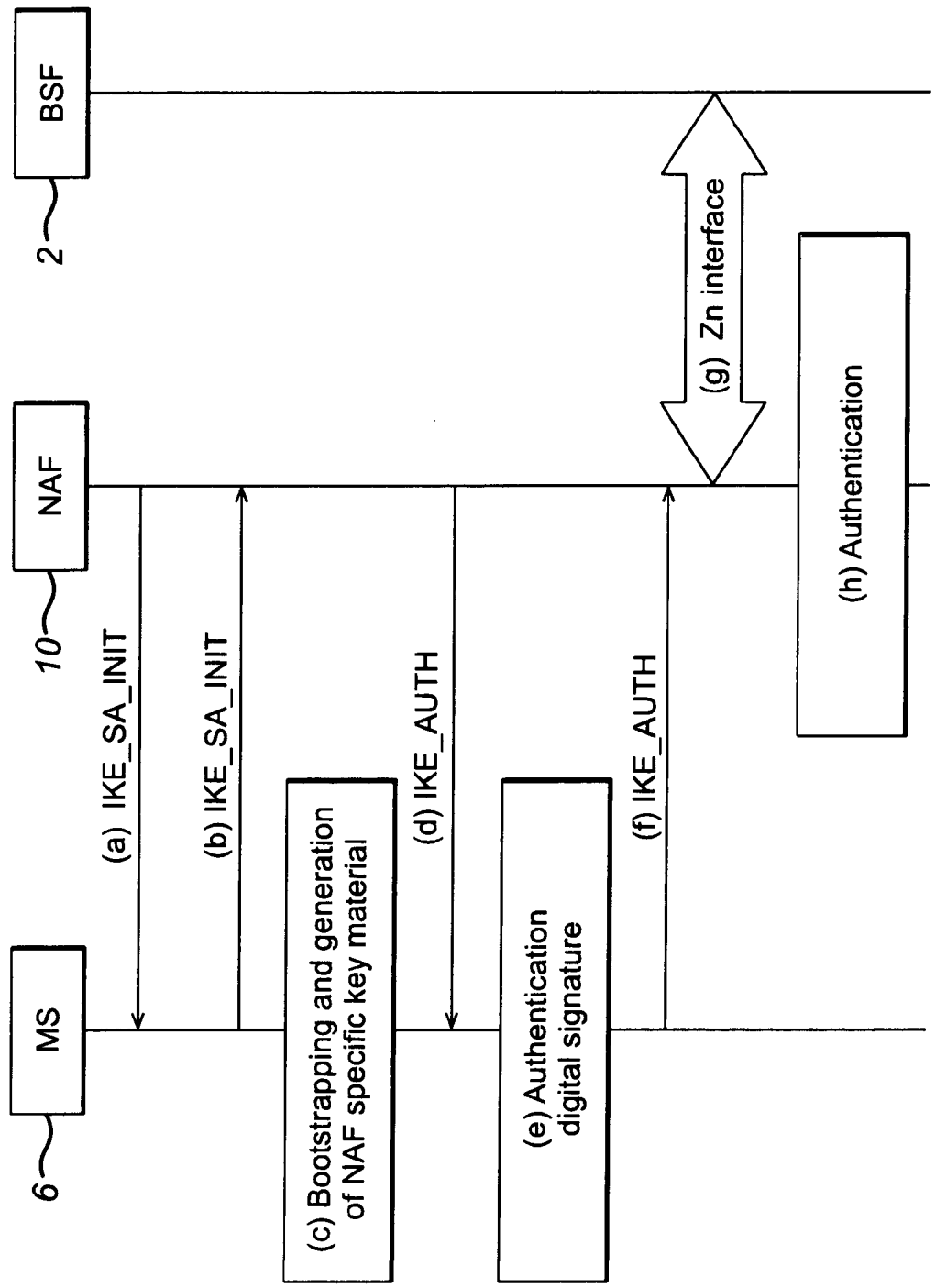

AUTHENTICATION IN COMMUNICATIONS NETWORKS

CROSS-REFERENCE TO RELATED APPLICATIONS

This application claims priority of U.S. Provisional Patent Application Ser. No. 60/741,055, filed Dec. 1, 2005, and U.S. Provisional Patent Application Ser. No. 60/757,872, filed Jan. 11, 2006. The subject matter of these earlier filed applications is hereby incorporated by reference.

The present application relates to authentication procedures in communications networks, particularly but not exclusively wireless communications networks.

The Third Generation Partnership Project 3GPP and 3GPP2 standards define a generic bootstrapping architecture (GBA) which allows bootstrapping of security keys between a user equipment (UE) (or mobile station (MS)) and a network. In the network, the bootstrapping function is implemented by a bootstrapping service function (BSF). The security keys established by the bootstrapping service function can then be used to derive further security keys between the user equipment (or mobile station) and a network application function (NAF). It is useful for other security mechanisms in the network to use GBA-derived security associations (keys) to avoid the need for provisioning other separate security associations (SAs) or shared keys. In order to use GBA-derived security associations in other security mechanisms, it is required to specify how GBA-associated information and signalling can be embedded in the particular protocol. This is being specified in 3GPP2 S.P0114-0 "Security Mechanisms Using GBA" and currently three security mechanisms are specified, namely TLS (Transport Layer Security, reference IETF RFC 2246 for TLS 1.0) with preshared key, HTTP (HyperText Transfer Protocol v1.1) Digest Authentication (reference IETF RFC 2617) and certificate-based NAF authentication with shared GBA key MS authentication.

For packet-based transactions in a communication network, internet protocol (IP) mechanisms are utilised. To provide security, an internet key exchange (IKE) protocol has been developed, which allows two communicating parties to agree on the security algorithms (and the corresponding modes) to be used for secure communication (typically, but not necessarily, the IP Security Protocol, IPSec) and the associated keys. A first version of the internet key exchange protocol is specified in RFC2409 Request for Comments 2409, Category: Standards Track, Nov. 98. It has been in use in, for example as part of VPN (Virtual Private Network) gateways and VPN clients. It is nevertheless complex, which in particular causes difficulties for mobile terminals with low computation power and storage capacity. The current IKE version can use pre-shared keys or certificates.

A second version of the internet key exchange protocol, IKEv2, is being developed to improve on the first version, particularly in relation to mobile terminals accessing the internet. The second version is specified in internet draft draft-ietf-ipsec-ikev2-17.txt of September 2004. IKE and IKEv2 require the communicating parties to either share a secret, or else Public Key technology is used. The latter requires the support of Public Key Infrastructure (PKI) and is computationally more expensive.

Our earlier U.S. Provisional Application No. 60/741,055 filed 1 Dec. 2005 (PWF Ref. 310360US), hereby incorporated by reference describes security associations derived from GBA used as the shared secret for a security protocol such as IKE and IKEv2. This deals with the application of such a technique when used with mechanisms that do not use GBA-derived keys, e.g. certificates.

According to one aspect of the present invention there is provided a method of authenticating a user equipment in a communications network, the method comprising: sending a message from a network entity to the user equipment including a set of options for an authentication procedure for authenticating an internet protocol communication over an interface between the user equipment and the network entity said options including a "shared-key"-based authentication procedure; selecting an option from the set and in the event that the "shared-key"-based authentication procedure is selected, generating a shared secret from a security key established in a generic bootstrapping architecture (GBA) over a different interface between the user equipment and a bootstrapping service function; and using the shared secret to compute and verify authentication payloads in the key-based authentication procedure for the communication over the interface.

The set of options can be in the form of a preference list and can include a certificate-based authentication procedure, which could be used when the user equipment does not support a key-based authentication procedure, or when the network entity prefers to do so. The method can include the step wherein the user equipment transmits a notification to the network entity indicating its capability of supporting different authentication procedures, and in particular whether it can support a "shared-key"-based authentication procedure using GBA.

The step of selecting an option from the list can be carried out at the user equipment.

Another aspect provides a network entity for use in a communications network comprising: means for establishing an internet protocol communication with a user equipment over an interface; means for accessing a shared secret to be used in a key-based authentication procedure for authenticating communication with the user equipment, said shared secret having been established in a generic bootstrapping architecture (GBA); means for dispatching a message to a user equipment including a set of options for the authentication procedure, the set of options including at least the option of using the shared secret in the key-based authentication procedure; and means for operation when the key-based authentication procedure is selected for validating an authorisation payload received from the user equipment over the interface and computed using the shared secret.

Another aspect provides a user equipment for using a communications network comprising: means for establishing a communication channel with a network entity in the communications network; means for receiving a message which includes a set of options for the authentication procedure, the set of options including at least the option of using the shared secret in the key-based authentication procedure for authenticating communication over the channel; means for selecting one of the set of options; means operable when the key-based authentication procedure is selected for using a security key derived from a generic bootstrapping architecture to generate the shared secret; means for computing an authentication payload for transmission to a network entity using the shared secret; and means for transmitting the payload in a message over the channel according to an internet protocol.

The computing and verifying can take place at both ends of the communication, that is they can be implemented by the network entity and by the user equipment. Alternatively, the user equipment can use the shared secret to compute an authentication payload, which the network entity verifies using the shared secret. In the reverse exchange, the network entity can send a digital signature with an optional certificate, so that the user equipment can carry out verification on its side by verifying the digital signature, with or without the certificate.

In the following, three embodiments are described giving different sequences of steps as more generically defined below. However, it will be appreciated that any suitable sequence of message exchange could be utilised.

According to a first embodiment, a method of authenticating a user equipment in a communications network comprises:

(a) sending a message from a user equipment to a network entity indicating the capability of the user equipment to support "shared-key"-based authentication using GBA;

(b) sending a message from a network entity to the user equipment including a set of options including at least the option that a shared secret is to be used in a key-based authentication procedure for authenticating a communication;

(c) when the shared secret option is selected, generating a shared secret from a security key already provided for authenticating a first communication between the user equipment and network entity;

(d) using the shared secret to compute an authentication payload and transmitting the authentication payload to the network entity;

(e) verifying the authentication payload at the network entity; and (f) transmitting a message from the network entity to the user equipment including an authentication payload computed using the shared secret; and (g) verifying the authentication payload using the shared secret at the user equipment.

A second embodiment of the invention provides a method of authenticating a user equipment in a communications network comprising steps a) to f) as defined according to a first method, wherein steps f and g) are replaced by the steps of the network entity dispatching a message to the user equipment including a digital signature and the user equipment verifying the digital signature, optionally using certificates embedded in the message from the network entity.

A third embodiment of the invention provides a method of authenticating a user equipment in a communications network comprising: sending a message from the network entity to the user equipment including a set of options, including at least the option that a shared secret derived from GBA is to be used in a key-based authentication procedure for authenticating a communication, the message including a digital signature; at the user equipment, transmitting a message indicating the capability of the user equipment to support "shared-key"-based authentication using GBA, verifying the digital signature and generating a shared secret from a security key provided for authenticating a first communication between the user equipment and the network entity; computing an authentication payload using the shared secret and dispatching a message to the network entity including the authentication payload; and at the network entity verifying the authentication payload using the shared secret.

A solution in accordance with one embodiment of the invention is to make use of GBA-derived security associations for authenticating the IKE exchanges, when the user equipment supports this. When it does not, a different authentication procedure can be used, e.g. certificate-based.

According to a further aspect of the present invention there is provided method of authenticating a user equipment in a communications network, the method comprising: establishing a security key in a generic bootstrapping architecture (GBA) over a first interface between the user equipment and a bootstrapping service function; generating a shared secret from the security key; sending a message from the network entity to the user equipment including notification that the shared secret is to be used in a key-based authentication procedure for authenticating an internet protocol communication over a second interface between the user equipment and a network entity; and using the shared secret to compute and verify an authentication payload in the key-based authentication procedure for the communication over the second interface.

Another aspect provides a network entity for use in a wireless communications network comprising: means for establishing an internet protocol communication with a user equipment over an interface; means for accessing a shared secret to be used in a key-based authentication procedure for authenticating communication with the user equipment, said shared secret having been established in a generic bootstrapping architecture (GBA); means for dispatching a message to a user equipment including a notification that the shared secret is to be used in the key-based authentication procedure; and means for validating an authorisation payload received from the user equipment over the interface and computed using the shared secret.

Another aspect provides a user equipment for using a communications network comprising: means for establishing a communication channel with a network entity in the communications network; means for receiving a message which includes a notification that a shared secret is to be used in a key-based authentication procedure for authenticating communication over the channel; means for using a security key derived from a generic bootstrapping architecture to generate the shared secret; means for computing an authentication payload for transmission to a network entity using the shared secret; and means for transmitting the payload in a message over the channel according to an internet protocol.

According to a further embodiment, a method of authenticating a user equipment in a communications network comprises:

(a) sending a message from a network entity to the user equipment including a notification that a shared secret is to be used in a key-based authentication procedure for authenticating a communication;

(b) generating a shared secret from a security key already provided for authenticating a first communication between the user equipment and network entity;

(c) using the shared secret to compute an authentication payload and transmitting the authentication payload to the network entity;

(d) verifying the authentication payload at the network entity; and (e) transmitting a message from the network entity to the user equipment including an authentication payload computed using the shared secret; and (f) verifying the authentication payload using the shared secret at the user equipment.

A further embodiment of the invention provides a method of authenticating a user equipment in a communications network comprising steps a) to e) as defined according to a first method, wherein steps e) and f) are replaced by the steps of the network entity dispatching a message to the user equipment including a digital signature and the user equipment verifying the digital signature, optionally using certificates embedded in the message from the network entity.

A further embodiment of the invention provides a method of authenticating a user equipment in a communications network comprising: sending a message from the network entity to the user equipment including a notification that a shared secret is to be used in a key-based authentication procedure for authenticating a communication, the message including a digital signature; at the user equipment, verifying the digital signature and generating a shared secret from a security key provided for authenticating a first communication between the user equipment and the network entity; computing an authentication payload using the shared secret and dispatching a message to the network entity including the authentication payload; and at the network entity verifying the authentication payload using the shared secret.

For a better understanding of the present invention and to show how the same may be carried into effect, reference will now be made by way of example to the accompanying drawings, in which:

FIGS. 2a to 2d illustrate the structure of messages for the message exchange of FIG. 2;

FIG. 3a illustrates the structure of a packet for use in the message exchange of FIG. 3;

FIG. 4 is a schematic diagram of a message exchange in accordance with a third embodiment of the invention; and FIGS. 4a to 4d show the structure of packets for use in the message exchange of FIG. 4.

Figure 1:
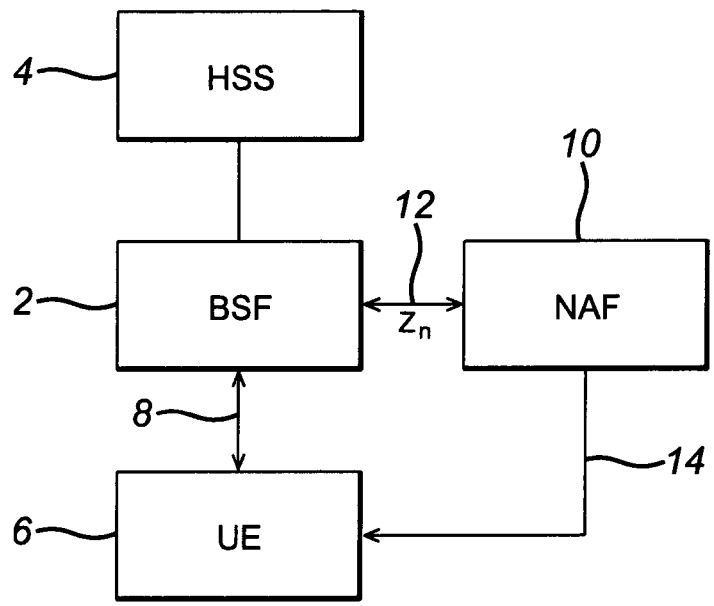
FIG. 1 is a schematic block diagram of a generic bootstrapping architecture.

FIG. 1 is a schematic diagram showing the main components of a generic bootstrapping architecture (GBA) defined in 3GPP/3GPP2. The architecture comprises a bootstrapping service function BSF 2 connected to a home subscriber server (HSS) 4 (or HLR (Home Location Register), or AuC (Authentication Center, in the 3GPP2 case) to implement the network side of an authentication procedure. The bootstrapping function BSF 2 can communicate with a user equipment UE 6 which can be in the form of a mobile station MS, for example a mobile telephone. It will be appreciated that other mobile devices can be used, including personal digital assistants, which communicate with the network using radio channels over a wireless interface. The wireless interface carried circuit switched, e.g. voice, signals and packet switched, e.g. data, signals. The authentication procedures discussed herein are concerned with packet switched communication. The bootstrapping service function 2 communicates with the user equipment 6 over an interface 8 which, in a wireless communications network, would be a wireless interface. A network applications function NAF 10 is located on the network side and can communicate with the bootstrapping service function BSF 2 and with the user equipment UE 6 over respective interfaces 12, 14 in a manner known per se. The interface 14 is the Ua Interface, which may or may not be wireless. For example this could be a broadband line connection, particularly in the case of a multi-access mobile device containing both wireless and non-wireless interfaces. Of importance, the GBA allows for the establishment of shared keys based on identities of the UE and the NAF to allow authorisation codes to be generated and verified. This is known in the art for the purposes of authenticating certain types of exchanges, and is described more fully in the following only to the extent necessary to understand the novel application described in the following embodiments in the context of IKE protocol.

The basic operation of GBA is explained as follows:
1. A bootstrapping procedure is performed between the UE/MS 6 and the BSF 2 (which is located in the home network). During bootstrapping, mutual authentication is performed between the MS and the home network, and a bootstrapping key, Ks, will be generated by both the UE/MS and the BSF. Associated with the Ks is a Bootstrapping Transaction Identifier (B-TID) and a lifetime of the Ks. In 3GPP, bootstrapping procedure is based on AKA. In 3GPP2, bootstrapping can be based on AKA, MN-AAA Key, or CAVE. Note that the Ub interface is based on HTTP protocol. The bootstrapping requires at least two roundtrips of messages between the UE/MS and the BSF.
2. As the second step, the UE/MS wants to access a network application server, called the Network Application Function (NAF), utilising GBA for security. To do so, the UE/MS communicates with the NAF over the Ua interface. The UE/MS conveys to the NAF the B-TID.
3. The UE/MS derives the application specific session keys Ks_NAF using a pre-defined key derivation function (KDF), with Ks, identifier of the NAF (NAF_Id), as well as other information as input. Upon receiving the request from UE/MS in step 2, the NAF contacts the BSF over the Zn to request the Ks_NAF. The NAF provides the B-TID received from the UE/MS, and provides its own identity (NAF_Id). The BSF derives the Ks_NAF in the same way as the UE/MS, and returns the derived key to the NAF. The Ks_NAF can then be used as the shared secret between the MS and the NAF for any further security operations. Note that depending on whether GBA_U is used, the NAF key may be Ks_NAF, Ks_int_NAF or Ks_ext_NAF. In the description below, we use Ks_NAF exclusively although it may refer to all the three possible keys, depending on the variant of GBA used.

As described above, the generic bootstrapping architecture uses the bootstrapping transaction identifier B-TID for binding elements that helps the user equipment, bootstrapping service function and network application functions to agree on the user equipment identity and related keying material. This allows the network application function to request corresponding keying material from the bootstrapping service function if it does not already have it.

In the context of the described embodiments of the present invention, the generic bootstrapping architecture 1 is used to supply network endpoints of communication paths in the network with a shared key. In the present context, the communication path is constituted by an IPSec tunnel operating between two endpoints, the user equipment 6 and a packet network application function NAF 10. The establishment of a tunnel for IP packets is well understood in the context of communication networks, particularly wireless communication networks. It will therefore not be discussed further herein. In the present case, the tunnel is an IP tunnel which operates using a security mechanism to provide confidentiality and data integrity protection for IP packets, the mechanism being known as IPSec ESP (RFC 2406). IPSec provides confidentiality, data integrity, access control and data source authentication to IP datagrams. In order for the IPSec mechanism to work, the source and destination of the IP datagram have to maintain a shared state, typically known as the IPSec Security Association (SA) which comprises information including the IPSec services provided for the datagram ESP (Encapsulating Security Payload) or AH (Authentication Header), tunnel or transport mode, etc), the cryptographic algorithms used and the keys used. The internet key exchange (IKE) protocol discussed above has been designed to establish this shared state in a dynamic fashion when required.

Figure 2:
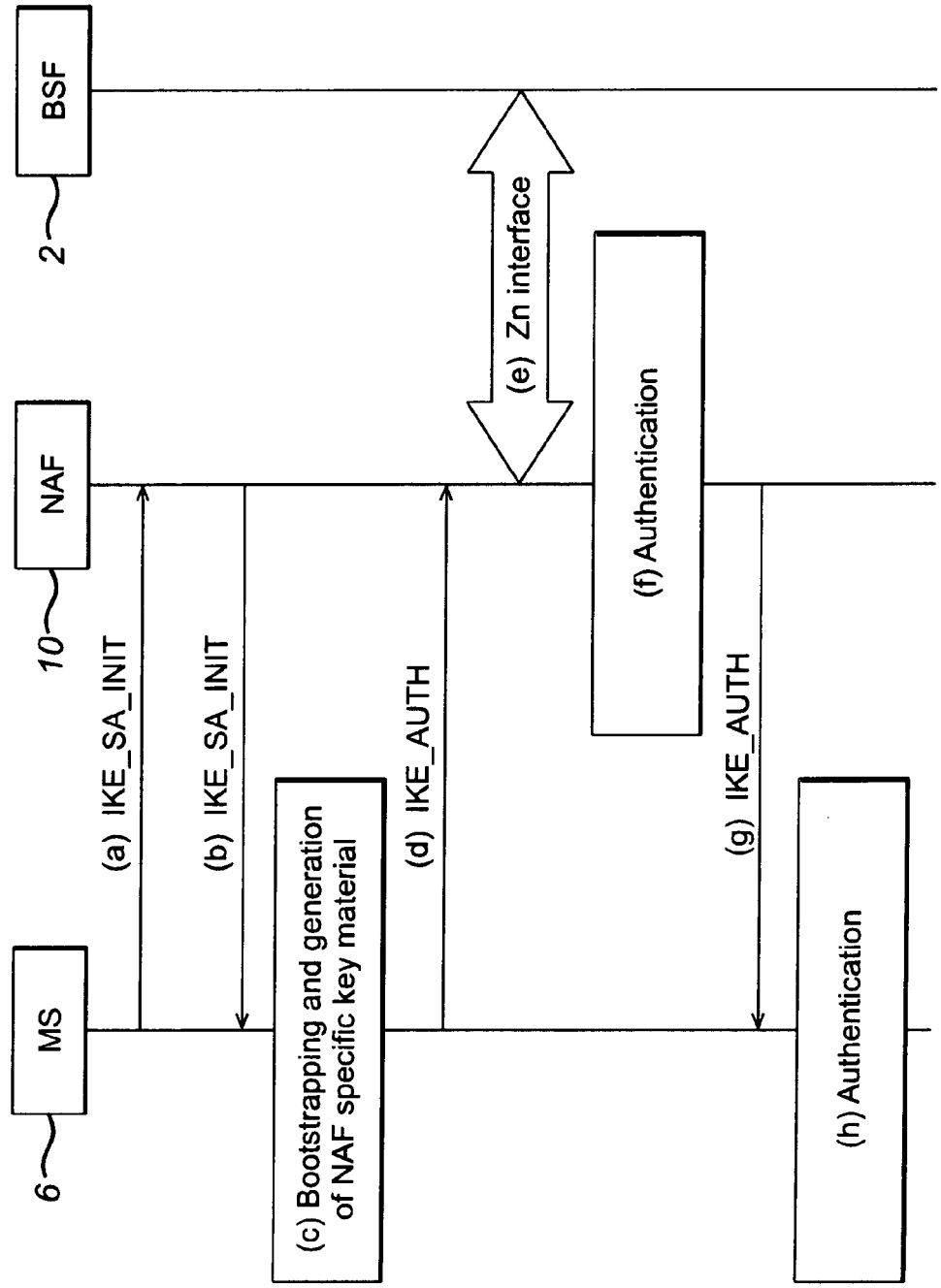
FIG. 2 is a schematic diagram illustrating message exchange in accordance with a first embodiment of the invention.

In the embodiments of the invention discussed below, keys derived from the generic bootstrapping architecture 1 can be used for authenticating the internet key exchanges. FIG. 2 illustrates the signal flow in a first embodiment of the invention. In FIG. 2 the user equipment 6 is referred to as a mobile station MS. The following describes the steps illustrated in FIG. 2. All IKE communications consist of pairs of messages: a request and a response. The pair is called an "exchange".

(a) The MS, acting as the IKE Initiator, sends a request message of the IKE_SA_INIT to the NAF. The message (see FIG. 2a) comprises a header HDR, the security association of the initiator SAil payload, which states the suite of cryptographic algorithms the initiator supports for the security association IKE_SA, the key exchange payload KE, which states the public information for the MS in a Diffie-Hellman exchange and Ni, the MS's nonce and a Notify payload to indicate that the MS is capable of IKEv2 using GBA derived keys.

The Notify payload uses a Notify message type of any value agreed in the range of 40960 to 65535, that is Private Use, and the string "3GPP-bootstrapping" in the notification data field. This is illustrated as N(GBA) in FIG. 2a.

In some embodiments of the invention there is no N(GBA) notify payload where the mechanisms do not use GBA derived keys and use certificates instead.

(b) The NAF, acting as the IKE responder, sends a response IKE_SA_INIT to the MS. The message (see FIG. 2b) comprises a header HDR, the SArl payload expressing its choice of the cryptographic suite, the KEr payload containing the NAF's Diffie-Hellman value, and Nr, the NAF's nonce. The NAF also appends a Notify payload N(GBA) to indicate that GBA-derived keys should be used for authenticating this IKE session.

The Notify payload shall use a Notify Message Type of any value agreed between 40960 and 65535 (Private Use) and the string "3GPP-bootstrapping" followed by ";" and a list of options supported by the NAF for authenticating the key exchange in the Notification Data (ND) field. The options include "gba" for GBA derived key, and "cert" for certificate. Other options may be defined in the future. In one embodiment of the invention, the order of the options in the list can also indicate NAF's preference of the options. For instance, if NAF supports both GBA derived keys and certificates, but prefers GBA derived keys, the notification data field shall be set to "3GPP-bootstrapping;gba, cert".

In some embodiments the Notify payload shall use a Notify Message Type of 40960 (Private Use) and the string "3GPP-bootstrapping" in the Notification Data (ND) field.

(c) If the MS selects the option "gba" and has a valid bootstrap key Ks (obtained by performing a bootstrapping procedure with the BSF), it shall use this and the NAF-ID, which is the NAI (Network Address Identifier) of the NAF to calculate a new key Ks_NAF, according to the GBA specification. Otherwise, if the bootstrap key Ks is not valid, it shall perform a bootstrapping procedure with the BSF to generate a fresh key Ks and then generate a new key Ks_NAF. The details of these procedures are known by a person skilled in the art and are not described further herein.

(d) The MS sends a first message IKE_AUTH of the authentication exchange to the NAF. In this message (see FIG. 2c):
  i. The identification payload of the initiator, IDi, shall use ID Type of "ID_KEY_ID", where the identity shall be a string made up of "3GPP-bootstrapping" followed by the separator character ";" and finally the B-TID.
  ii. IDr payload may be optionally included. If included, it shall use ID Type of "ID_KEY_ID", where the identity shall be a string made up of "3GPP-bootstrapping" followed by the separator character ";" and finally the NAF-ID.
  iii. The AUTH payload shall be computed using Ks_NAF as the shared secret.

The AUTH value is computed as:

AUTH=prf(prf(Ks_NAF, "Key Pad for IKEv2", <msg octets>))

(e) The NAF extracts the B-TID from the message received in (d). If it does not already have the relevant Ks_NAF, it fetches the key from the BSF by sending the B-TID and its NAF-ID to the BSF. The NAF may have already received the relevant Ks_NAF by an earlier communication. That is, it may have communicated with the UE/MS before and still has a valid Ks_NAF stored locally, which is tied to the B-TID. So, first time MS talks to NAF, NAF contacts BSF to get the Ks_NAF, which has an associated lifetime. NAF stores this key along with B-TID and the lifetime. Subsequently, when the same MS talks to the same NAF, it presents the same B-TID, the NAF checks first locally whether the B-TID is tied to any Ks_NAF that hasn't expired, if so, it doesn't have to contact the BSF this time.

(f) The NAF verifies the AUTH payload received in (e) using Ks_NAF as the shared secret.

(g) The NAF sends an IKE_AUTH response to the MS. In this message (FIG. 2d):
  i. IDr payload shall use ID Type of "ID_KEY_ID", where the identity shall be a string made up of "3GPP-bootstrapping" followed by the separator character ";" and finally the NAF-ID.
  ii. The AUTH payload shall be computed using Ks_NAF as the shared secret.

(h) The MS verifies the AUTH payload received in (g) using Ks_NAF as the shared secret.

Once the above IKE exchanges have been completed, either the MS or the NAF may initiate a CREATE_CHILD_SA exchange to create further security associations required as specified in IKEv2. The Traffic Selectors TSi, TSr shown in FIGS. 2c, 2d, 3a and 4c deal with the child SA negotiated in 1KEv2 and are not discussed further herein.

In the above method, the NAF indicates to the MS that bootstrapped security association is required by appending the Notify payload in the IKE_SA_INIT response sent to the MS. The existence of this payload triggers the MS to use GBA keys.

A bootstrapping re-negotiation can be indicated by the NAF to the MS, if the existing bootstrapped security association used in the IKE_AUTH request sent by the MS has expired and a new bootstrapped security association is required, by sending an error response to the IKE-AUTH request. The error response shall include a Notify Payload with a Notify Message Type of 24: "AUTHENTICATION FAILED". When the MS receives this error response to an IKE_AUTH generated based on existing bootstrapped security association, this triggers the MS to generate a new Ks with the BSF through a new bootstrapping.

Figure 3:
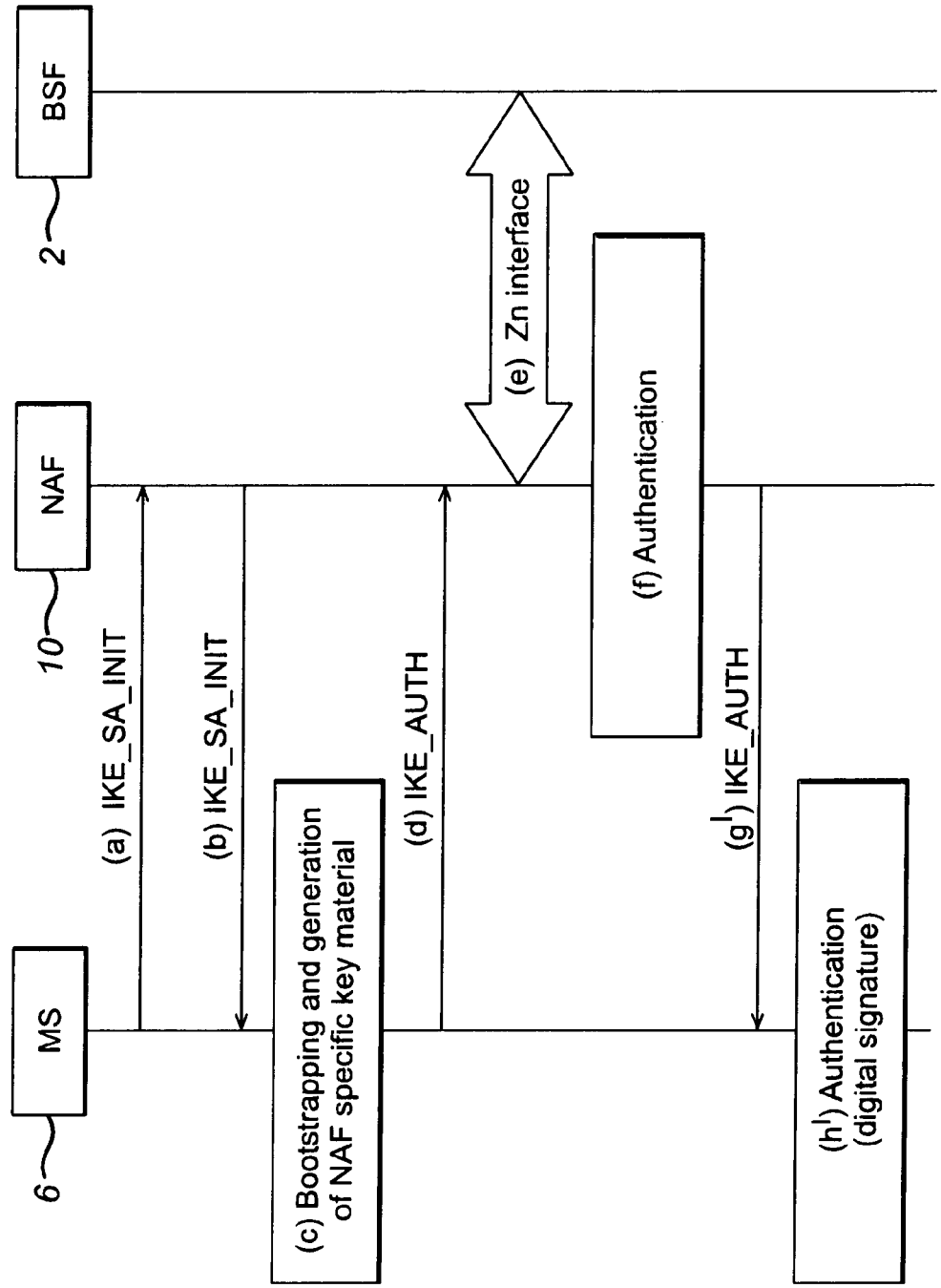
FIG. 3 is a schematic diagram illustrating the message exchange of a second embodiment of the invention.

In a second embodiment of the invention, the NAF may use certificate-based authentication, while the MS use GBA keys (Ks_NAF). This is illustrated in FIG. 3.

The flow is basically the same as that shown in FIG. 2 except in Steps g and h which is explained as follows:

(g') The NAF sends an IKE_AUTH response to the MS. In this message (see FIG. 3a):
  i. IDr payload shall use ID Type of "ID_KEY_ID", where the identity shall be a string made up of "3GPP-bootstrapping" followed by the separator character";" and finally the NAF-ID.
  ii. The AUTH payload shall contain a digital signature based on a private key owned by the NAF.

iii) The CERT payload may be optionally included. If included, it contains a certificate, or certificate chain providing evidence that the key used to compute the digital signature belongs to the name in the ID payload (i.e. NAF_ID.

(h') The MS verifies the AUTH payload received in (g'). To do so, the MS may have to verify the certificate (or certificate chain) attached, or alternatively, the NAF's certificate may be available locally at the MS (by means of pre-configuration or from previous communications). The MS also have to verify the signature attached in the AUTH payload.

In yet another embodiment, the NAF may take the role of an IKE initiator that initiates the IKE exchange. From the point of view of GBA, the MS always initiates the communication towards the NAF by sending an application request. However, this application request may then trigger the NAF to initiate an IKE exchange towards the MS. Under this scenario, a possible message flow may be as illustrated in FIG. 4.

In this scenario, the NAF will not have the B-TID of the MS until step (f) in the flow.

(a) The NAF, acting as the IKE Initiator, sends a first message of the IKE_SA_INIT to the MS. This message (see FIG. 4a) comprises a header, the SAil payload, which states the cryptographic algorithms the initiator supports fro the IKE-SA, the KE payload, which states the NAF's Diffie-Hellman value, and Ni, the NAF's nonce. The NAF also appends a Notify payload to indicate that GBA-derived keys should be used for authenticating this IKE session.

The Notify payload uses a Notify message type of any value agreed in the range of 40960 to 65535, that is Private Use, and the string "3GPP-bootstrapping" followed by ";" and a list of options supported by the NAF for authenticating the key exchange in the notification data field. This is illustrated as N(GBA) in FIG. 2. The options include "gba" for GBA derived key, and "cert" for certificate. Other options may be defined in the future. In one embodiment of the invention, the order of the options in the list can also indicate NAF's preference of the options. For instance, if NAF supports both GBA derived keys and certificates, but prefers GBA derived keys, the notification data field shall be set to "3GPP-bootstrapping;gba,cert".

In some embodiments the Notify payload shall use a Notify Message Type of 40960 (Private Use) and the string "3GPP-bootstrapping" in the Notification Data (ND) field.

(b) The MS acting as the IKE responder, sends a response to the NAF. The message (FIG. 4b) comprises a header HDR, the SArl payload expressing its choice of the cryptographic suite, the KEr payload containing the MS's Diffie-Hellman value, and Nr, the MS's nonce, and a notify payload to indicate that the MS is capable of IKEv2 using GBA derived keys.

The Notify payload uses a Notify message type of any value agreed in the range of 40960 to 65535, that is Private Use, and the string "3GPP-bootstrapping" in the notification data field. This is illustrated as N(GBA) in FIG. 4b.

(c) If the MS has a valid Ks, it shall use this and the NAF-ID to calculate the Ks_NAF. Otherwise, it shall perform a bootstrapping procedure with the BSF to generate a fresh Ks and then generate Ks_NAF.

(d) The NAF sends the first message of the IKE_AUTH exchange to the MS. In this message (FIG. 4c):
i. IDi payload shall use ID Type of "ID_KEY_ID", where the identity shall be a string made up of "3GPP-bootstrapping" followed by the separator character";" and finally the NAF_ID.
ii. The AUTH payload shall contain a digital signature based on a private key owned by the NAF.
iii. The CERT payload may be optionally included. If included, it contains a certificate, or certificate chain providing evidence that the key used to compute the digital signature belongs to the name in the ID payload (i.e. NAF-ID).

(e) The MS verifies the AUTH payload received in (d). To do so, the MS may have to verify the certificate (or certificate chain) attached, or alternatively, the NAF's certificate may be available locally at the MS (by means of pre-configuration or from previous communications). The MS also have to verify the signature attached in the AUTH payload.

(f) The MS sends an IKE-Auth response to the NAF. In this message:
i. IDr payload shall use ID Type of "ID-KEY_ID", where the identity shall be a string made up of "3GPP-bootstrapping" followed by the separator character "" and finally the B-TID.
ii. The AUTH payload shall be computed using Ks_NAF as the shared secret.

(g) The NAF extracts the B-TID from the message received in (f). If it does not already have the relevant Ks_NAF, it fetches the key from the BSF by sending the B-TID and its NAF-ID to the BSF.

(h) The NAF verifies the AUTH payload received in (g) using Ks_NAF as the shared secret.

Figure 5:
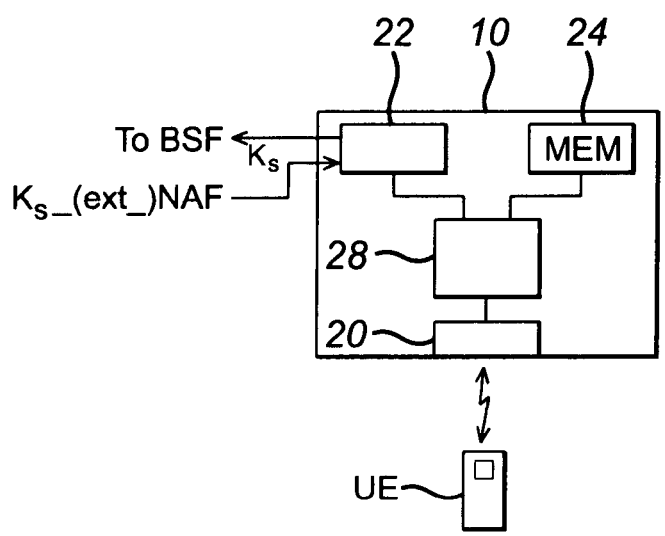

FIG. 5 is a schematic block diagram of a network entity to illustrate functional components for implementing the above embodiments of the present invention.

Reference numeral 20 denotes an RF interface for establishing a wireless channel with a user equipment UE.

Reference numeral 22 illustrates a functional component capable of accessing a shared secret for authentication communications over the wireless channel. This functional component can access the shared secret KS_NAF from a local memory 24 or can transmit a message 26 to the bootstrapping service function for accessing the shared secret from that function based on the existing key $KEY_s$. The network entity also includes a processor programmed with suitable software 28 for computing the authentication payload as discussed above. The processor 28 also has the capability of dispatching and receiving the messages discussed above, in particular compiling the list of options of authentication procedures.

Figure 6:
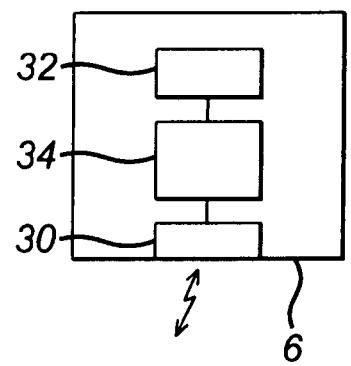

The user equipment UE contains similar functionality. This is illustrated in FIG. 6. The user equipment UE contains an RF interface for establishing a wireless channel with a network entity, local memory 32 for holding a GBA derived security key Ks and a processor 34 programmed with suitable software for computing and verifying the authentication payload as discussed herein above. In particular, the processor 34 is capable of understanding the notified payload in the message from the network entity and, responsive to that, deriving the security association Ks_NAF and using that for computing and verifying the authentication payload. The processor 34 is also responsible for determining the authentication capabilities of the user eqipment, advising the NAF accordingly and selecting an appropriate technique from the list of options supplied by the NAF.

The invention claimed is:
1. A method comprising:
sending a message from a network entity to an user equipment, wherein the message includes a set of options for an authentication procedure for authenticating an internet protocol communication over a first interface between the user equipment and the network entity, the set of options including a first option and a second option, wherein the first option represents using a first internet key exchange authentication procedure based on a security key obtained from a bootstrapping service function in accordance with a generic bootstrapping architecture, and wherein the second option represents using a second internet key exchange authentication procedure based on a certificate;

selecting at least one of the first option and the second option from the set of options and, when the first option is selected, the first internet key exchange authentication procedure is implemented between the network entity and the user equipment and a shared secret is generated from the security key established in the generic bootstrapping architecture over a second interface between the user equipment and the bootstrapping service function; and using the shared secret to compute and verify authentication payloads in the first internet key exchange authentication procedure for the internet protocol communication over the first interface.

2. A method according to claim 1, wherein when the second option is selected, the second internet key exchange authentication procedure is implemented between the network entity and the user equipment using the certificate rather than the shared secret, wherein the network entity comprises a network application function, wherein the user equipment is a mobile station, and wherein the internet protocol communication is over the first interface and a wireless network.

3. A method according to claim 1, wherein the set of options is in the form of a preference list.

4. A method according to claim 1, wherein the step of selecting is carried out at the user equipment.

5. A method according to claim 1, wherein the set of options includes a certificate based authentication procedure.

6. A method according to claim 1, wherein the communication over the first interface uses the internet key exchange protocol.

7. A method according to claim 1, wherein the first interface is wireless.

8. A method according to claim 1, wherein the second interface is wireless.

9. A method according to claim 1, comprising the step of transmitting a network entity identifier from the network entity to the user equipment, and using the network entity identifier to generate the shared secret from the security key.

10. A method according to claim 1, wherein the step of computing the authentication payload is carried out at the user equipment.

11. A method according to claim 1, wherein the step of verifying the authentication payload using the shared secret is carried out at the network entity.

12. A method according to claim 1, wherein the user equipment transmits a bootstrapping transaction identifier to the network entity as part of said authentication procedure.

13. A method according to claim 12, wherein the network entity uses the bootstrapping transaction identifier to access the shared secret.

14. A method according to claim 1, when used to mutually authenticate the user equipment and the network entity wherein the network entity computes the authentication payload using the shared secret.

15. A method according to claim 14, wherein the user equipment verifies the authentication payload using the shared secret.

16. A method according to claim 15, wherein the message includes at least one certificate for authenticating a digital signature.

17. A method according to claim 1, wherein the network entity sends a message including a digital signature and wherein the user equipment verifies the digital signature.

18. An apparatus comprising:
a network entity comprising at least one processor configured to
establish an internet protocol communication with a user equipment over an interface;
dispatch a message to the user equipment including a set of options for an authentication procedure, the set of options including a first option of using a shared secret derived based on a security key obtained from a bootstrapping service function in accordance with a generic bootstrapping architecture and a second option of using a certificate;
receive an authentication payload from the user equipment when the first option is selected, the authentication payload having been computed using the shared secret from the user equipment; and
authenticate the received authentication payload using the shared secret from the bootstrapping function.

19. The apparatus according to claim 18, wherein communication over the interface uses the internet key exchange protocol.

20. The apparatus according to claim 18, wherein the access of the shared secret comprises dispatching a user equipment identifier with a network entity identifier to a bootstrapping service function in the network.

21. An apparatus comprising:
a user equipment comprising at least one processor configured to
establish a communication channel with a network entity in the communications network;
receive a message which includes a set of options for the authentication procedure, the set of options including a first option of using a security key obtained from a bootstrapping service function in accordance with a generic bootstrapping architecture and a second option of using a certificate;
select one of the set of options;
compute an authentication payload for transmission to a network entity using a shared secret generated from the security key established in the generic bootstrapping architecture, when the first option is selected; and
transmit the authentication payload in a message over the channel according to an internet protocol.

22. An apparatus according to claim 21, wherein the internet protocol is the internet key exchange protocol.

23. An apparatus according to claim 21 further comprising transmitting a notification indicating that the user equipment supports the first option.

24. A method comprising:
establishing a communication channel with a network entity in a communications network;
receiving, at a user equipment, a message including a set of options for an authentication procedure, the set of options including a first option and a second option, wherein the first option represents using a first internet key exchange authentication procedure based on a security key obtained from a bootstrapping service function in accordance with a generic bootstrapping architecture, and wherein the second option represents using a second internet key exchange authentication procedure based on a certificate;
selecting one of the set of options;
computing an authentication payload for transmission to a network entity using a shared secret generated from the security key established in the generic bootstrapping architecture, when the first option is selected; and transmitting the authentication payload in a message over the channel according to an internet protocol.

\* \* \* \* \*